United States Patent
Kono et al.

(10) Patent No.: US 6,615,095 B1
(45) Date of Patent: Sep. 2, 2003

(54) GOODS PROCESSING DEVICE AND MANAGING SYSTEM

(75) Inventors: Katsuaki Kono, Shiga (JP); Takafumi Ohtani, Shiga (JP); Akira Ishino, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 198 days.

(21) Appl. No.: 09/856,956
(22) PCT Filed: Oct. 2, 2000
(86) PCT No.: PCT/JP00/06856
§ 371 (c)(1), (2), (4) Date: May 29, 2001
(87) PCT Pub. No.: WO01/25859
PCT Pub. Date: Apr. 12, 2001

(30) Foreign Application Priority Data

Oct. 4, 1999 (JP) .......................................... 11-282472

(51) Int. Cl.⁷ .............................................. G06F 19/00
(52) U.S. Cl. ........................... 700/108; 700/95; 700/96
(58) Field of Search ...................... 700/96, 108; 707/10

(56) References Cited

U.S. PATENT DOCUMENTS 3,938,106 A  *  2/1976  Becker et al. ............... 700/108
4,827,423 A  *  5/1989  Beasley et al. ............... 700/96
5,847,957 A  * 12/1998  Cohen et al. ............... 700/108
5,883,805 A  *  3/1999  Sada ........................... 700/100
6,064,982 A  *  5/2000  Puri ............................ 700/95

* cited by examiner

*Primary Examiner*—Leo Picard
*Assistant Examiner*—W Russell Swindell
(74) *Attorney, Agent, or Firm*—Shinjyu Global IP Counselors, LLP (57) ABSTRACT

An object of the present invention is to present a control system that can be constructed using existing equipment and that can be adapted easily to changes in a production line. A product processing apparatus 2 or an RCU 3 and information terminals 4 are interconnected by the Internet or by an intranet 5. A WWW server 34 and a CGI are loaded onto the RCU 3, and a WWW browser is loaded onto the information terminal 4a. A processing program 39 that reads and writes operational information between the WWW server 34 and an operational program 31 that operates within the control unit of the product processing apparatus 2 and the RCU 3 is loaded onto the RCU 3. When a WWW browser accesses a web page prepared in advance on the WWW server 34, the processing program 39, activated by the CGI, provides operational information to the WWW server 34. The WWW server 34 presents the operational information to the WWW browser.

14 Claims, 7 Drawing Sheets

| PRODUCT NAME | Potate |
| --- | --- |
| PRODUCT CODE | 1234 |
| SPEED | 60 |
| TARGET WEIGHT | 100.0 g |
| UPPER LIMIT | 5.0 g |
| FEEDER ADJUST | Feeder |
| HOPPER ADJUST | Hopper |

[ Registration ] [ Reset ]

Fig. 5

PRODUCT

| OVER | 2 |
| --- | --- |
| PROPER | 316 |
| UNDER | 1 |
| SPEED | 59.4bpm |

WEIGHT

| MEAN | 100.5 g |
| --- | --- |
| STD DEV | 0.621 g |

HISTGRAM

| | | 0   100   200 |
| --- | --- | --- |
| 98.0 g | 0 | |
| 99.0 g | 1 | * |
| 100.0 g | 198 | ************************ |
| 101.0 g | 94 | ********** |
| 102.0 g | 15 | ** |
| 103.0 g | 5 | * |
| 104.0 g | 2 | * |
| 105.0 g | 2 | * |
| 106.0 g | 2 | * |

Conceptual diagram of conventional control system

Fig. 8
(Prior Art)

GOODS PROCESSING DEVICE AND MANAGING SYSTEM

TECHNICAL FIELD

The present invention relates to a product production line control method used in product production lines for such products as industrially produced foodstuffs and industrial parts.

BACKGROUND TECHNOLOGY

Figure 7:
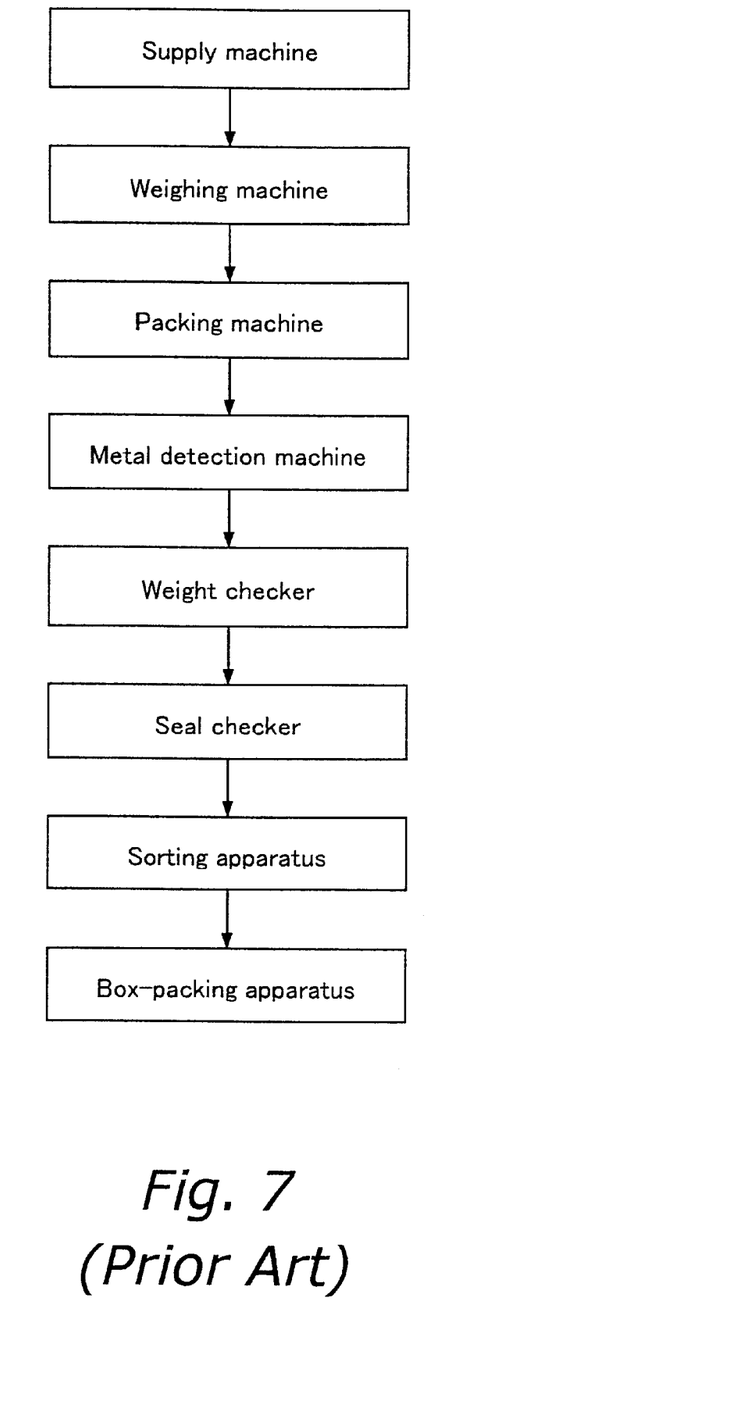
FIG. 7 is a representation of a typical production line.

In conventional production lines where a set weight or a set number of pieces of a mass-produced snack or similar product is put into individual bags, the following processing is conducted. First, the mass-produced product is supplied to a measuring apparatus where it is divided into portions of a set quantity; then those portions are put into individual bags by a bagging apparatus, giving the product the form in which it will be sold. The bagged products are then transported to an inspection line made up of a metal detector, weight checker, seal checker and the like. Substandard products are set aside by this inspection line, and only the good products are packed by a box-packing apparatus. FIG. 7 provides a representation of a typical such production line.

The operational conditions of each product processing apparatus constituting such a production line are set in accordance with the product being produced. However, in many cases, simply setting the optimal operational conditions for each of the individual apparatuses will not result in the operational conditions for the production line as a whole being met. In other words, because each of the individual product processing apparatuses operates in tandem with each other, the relationships among each apparatus have to be considered when setting the operational conditions for each individual machine. Furthermore, since these apparatuses are working together in this way, if just one of these product processing apparatuses stops, then the entire production line stops. Therefore, the operational status of each of the apparatuses constituting the production line have to be monitored constantly. For this reason, as disclosed in Laid-open Japanese Patent Application No. H9-301327, control systems are used to control the operational conditions of each individual product processing apparatus constituting the production line.

Figure 8:
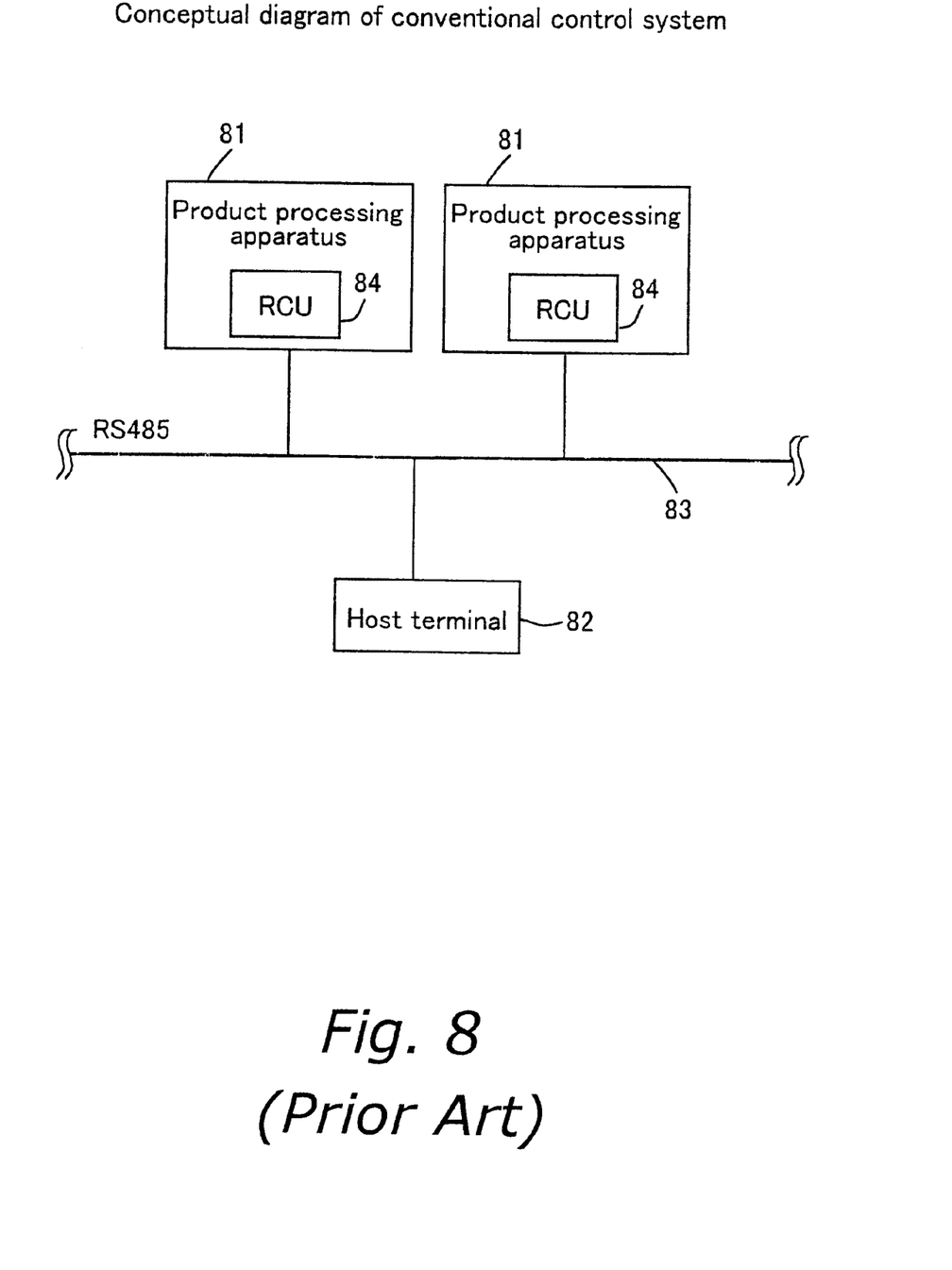
FIG. 8 is a drawing showing one example of the constitution of a conventional control system.

FIG. 8 is a representation of a control system for the operational conditions in a conventional production line. The control system shown in FIG. 8 includes individual product processing apparatuses 81, a host terminal 82 for monitoring these apparatuses, and a dedicated communications lines 83 such as an RS 485, an ARCNET or the like. The individual apparatuses 81 are interconnected with an RCU (remote control unit) 84 for operating these apparatuses. Each RCU has a telecommunications board, and those telecommunication boards and the telecommunications board in the host terminal are interconnected by the dedicated communications line.

With this control system, an exclusive communications processing program must be created specifically to correspond with the dedicated communications line 83. Furthermore, an exclusive program for the host terminal must be created in order to display data showing operational information of the production line on the host terminal 82 as well as to make settings, and that program has to be adapted to all the interconnected machines.

With this type of control system, if there are any changes to the production line, e.g., if there are changes in the number of the apparatuses or in the product processing apparatuses constituting the production line, the host terminal 82 program must be updated in correspondence with the production line. Moreover, in the case of a control system using an exclusive host terminal, there are restrictions as to where operations can be performed, as such operations can only be performed where that host terminal is located. Furthermore, because of an exclusive program, special operations have to be learned, meaning that time is needed to learn these operations.

In addition, because of the recent diffusion of the telecommunications infrastructure, it is common for production lines to have their own LAN, in which case an Ethernet is usually used. In such cases, with an RS485 communications specification program, either the functions relating to communication functions have to be remade, or a communication specification conversion box must be added. Moreover, in most cases information terminals such as personal computers (PCs) are part of the telecommunication infrastructure, and in such cases these information terminals use communication specifications using TCP/IP. Therefore, users tend to avoid adding ARCNET or an exclusive host terminal.

It is an object of the present invention to present a product production line control system that can be constructed using existing equipment, can easily adapt to changes in a product production line, and requires only a short time for learning operations without having limitations as to where the operations can be performed, as well as to present product processing apparatuses to be used with the system.

DISCLOSURE OF THE INVENTION

In order to solve the problems presented above, a first aspect of the present invention presents a product processing apparatus used in a product production line and presenting operational information via a network to an information terminal. The apparatus includes a network interface, storage means, a WWW server, presentation means, transfer means and conversion means.

The network interface uses TCP/IP to communicate with the information terminal. Storage means stores the operational information. The WWW server receives from the WWW browser of the information terminal instructions regarding the operational information to be presented to the information terminal, and based on the received instructions designates such operational information. Presentation means presents the designated operational information to the information terminal. Delivery means, pursuant to the designation, delivers operational information between the storage means and the presentation means. Conversion means converts the stored operational information into a format useable by the information terminal.

Using a WWW browser on the information terminal a user accesses a web page that presents information of the targeted product processing apparatus. A WWW server on the product processing apparatus acquires operational information of the product processing apparatus via delivery means and presents this to the information terminal. If a product processing apparatus of the present invention is used, a user can gain access to the operational information regardless of his location, by using a WWW browser on an information terminal connected to the Internet or an intranet. Therefore the operations of a production line can be monitored at any time. Furthermore, because an ordinary communications specification is used, there is no need to prepare a special program or facilities for communication.

Furthermore, because the output formats are kept consistent, the time required for operator training is shortened and the number of operating mistakes is reduced.

A second aspect of the present invention presents a product processing apparatus according to the first aspect, wherein the conversion means converts operational information into data for display by a WWW browser, and the presentation means is a WWW server that transmits the converted operational information to the WWW browser on the information terminal.

Since operational information is displayed using an existing application, the operation of that application is easy, and existing resources can be put to good use.

A third aspect of the present invention presents a product processing apparatus according to the first aspect, wherein the conversion means converts operational information into printable data and the presentation means is a printer client that sends the converted operational information to the information terminal, which has a print server function.

Operational information that has been printed can be stored as permanent records. These records can be used as materials for such cases as guaranteeing products results, measures against product liability lawsuits, and proposing future production plans.

A fourth aspect of the present invention presents a product processing apparatus according to the first aspect, wherein the conversion means converts operational information into email and the presentation means is an email client that sends the converted operational information to the information terminal, which has an email server function.

As with the third aspect of the present invention, the operational information can be stored as permanent records. The party responsible for the production line can confirm operational status at any time convenient for him. Moreover, with a combination of a push-type email server and a portable wireless terminal, an even better response to errors is possible.

A fifth aspect of the present invention presents a product processing apparatus according to the first aspect, wherein the conversion means converts operational information into a file and the presentation means is an FTP client that sends the converted operational information to the information terminal, which has an FTP server function.

As with the third aspect of the present invention, the operational information can be stored as permanent records, with the further advantage of not requiring the physical space for storage required with paper records.

A sixth aspect of the present invention presents a product processing apparatus according to any of the first through fifth aspects, wherein image information is included in the operational information, and further comprising image-taking means for taking images of the image information.

Including image information in the operational information has the advantage of allowing confirmation of conditions that are difficult to grasp just with character-based information.

A seventh aspect of the present invention presents a product processing apparatus used in a product production line wherein drive conditions can be set from an information terminal over a network. The product processing apparatus includes a network interface, storage means, a WWW server, and update means.

The network interface communicates with the information terminal using TCP/IP. Storage means stores the drive conditions. The WWW server receives from a WWW browser on the information terminal the drive information set from the information terminal. Update means updates drive conditions stored in the storage means pursuant to the received drive conditions. Using a WWW browser on an information terminal connected to the Internet or an intranet, a user can reset drive conditions regardless of where he might be. Therefore, a machine on a production line that has a setting error or other problem can easily be put in good order.

An eighth aspect of the present invention presents a product processing apparatus used in a product production line wherein drive conditions can be set from an information terminal over a network. The product processing apparatus comprises a network interface, storage means, reception means, and update means.

The network interface communicates with the information terminal using TCP/IP. Storage means stores the drive conditions. Reception means receives files from the information terminal. Update means updates drive conditions stored in the storage means pursuant to the received files.

As with the seventh aspect, multiple operational information can be written in a file and reset. Furthermore, version upgrades of a drive program for a product processing apparatus can be written into files, so that the program can be updated.

A ninth aspect of the present invention presents a production line control system that presents over a network operational information from a plurality of product processing apparatuses used in a product production line to an information terminal, or that is capable of setting operational information for a plurality of product processing apparatuses over a network from an information terminal.

A product processing apparatus includes a network interface, storage means, a WWW server, presentation means, delivery means, conversion means and update means. The information terminal comprises output means and a WWW browser.

The network interface uses TCP/IP to communicate with the information terminal. Storage means stores the operational information. The WWW server receives from a WWW browser of the information terminal instructions regarding operational information to be presented to the information terminal, and based on the instructions can designate such operational information. The WWW server can also receive from the WWW browser of the information terminal drive conditions set from the information terminal. Presentation means presents the designated operational information to the information terminal. Delivery means delivers operational information between the storage means and the presentation means, pursuant to the designation. Conversion means converts the stored operational information into a format useable by the information terminal. Update means updates the drive conditions stored in the storage means pursuant to drive conditions received from the WWW browser.

Output means outputs operational information presented from the presentation means. The WWW browser can give the operational information instructions and set drive conditions to the WWW server of the product processing apparatus.

This has the same operational effect as the first and seventh aspects of the invention. A tenth aspect of the present invention presents a product processing apparatus used in a product production line and sending operational warning information over a network to information terminals. The apparatus includes specification means for specifying a portable wireless terminal among the information terminals, communications means communicating with the designated portable wireless terminal, and conversion means converting the operational warning information into voice data or email, and sends the converted operational warning information over the communications means.

When the apparatuses constituting a production line stop, a warning is sent out by radio to the party in charge; therefore, even if that party is not actually in the same location as the production line, he/she can learn of abnormalities arising in the production line, thus allowing him/her to monitor the production line without restrictions in terms of time and place.

PREFERRED EMBODIMENTS

Next, a detailed explanation of the control system and product processing apparatus relating to the present invention will be made while referring to the drawings.

First Embodiment

Constitution
(1) Overall Constitution

Figure 1:
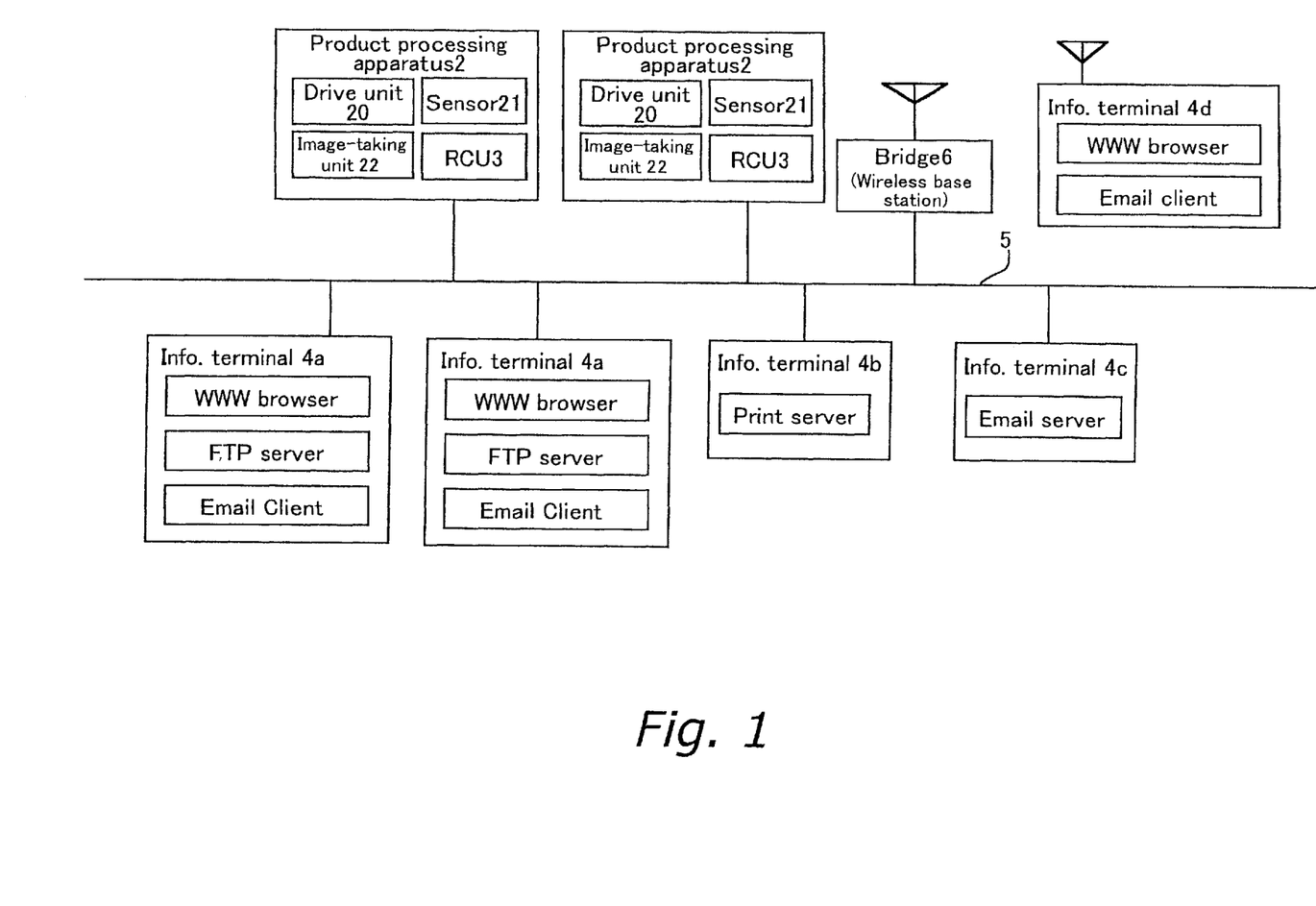
FIG. 1 is a constituent diagram of a control system relating to the first embodiment.

FIG. 1 shows the overall constitution of a production control system relating to the present invention.

This system has a plurality of product processing apparatuses 2, information terminals 4a, 4b, 4c, 4d, and communications line 5.

The product processing apparatuses 2 are product processing apparatuses constituting a product production line, which weigh out a set amount of a product such as foodstuffs and industrial parts, and after putting these products into bags, conduct quality checks, and pack the bags into boxes. For example, these can be supply machines, combining and weighing machines, bagging machines, seal checkers, metal detectors, weight checkers, sorting machines, and box-packing machines. As will be described below, each product processing apparatus 2 is provided with an RCU 3, and loaded onto each RCU 3 are a WWW (World Wide Web) server 34, an email client 35, an FTP client 36, and a print client 37 (see FIG. 2). A detailed explanation of the product processing apparatus will follow below.

The information terminal 4a has a personal computer or workstation or the like, and is interconnected with the communications line 5 via a network interface. Loaded onto the information terminal 4a is a WWW browser, an FTP server and an email client, making the information terminal 4a capable of accessing the WWW server 34 of each product processing apparatus 2, transmitting files to and receiving files from the FTP client 36 thereof, and transmitting email to and receiving email from the email server 4c thereof. The WWW browser specifies with an IP address or the like the product processing apparatus with which it is to communicate, and causes the HTML (Hyper Text Markup Language) documents and the like stored therein to be displayed.

The information terminal 4b has a print server, and is interconnected with the communications line 5 via a network interface. The information terminal 4b is connected to a printer. The print server receives print signals from a print client, and the corresponding data is printed by the printer.

The information terminal 4c has an email server, and is interconnected with the communications line 5 via a network interface. The email server saves email for each email address that it manages. The email server also has a push function, so that whenever it receives email from an email client, it immediately distributes the email to the email client indicated by the email address.

The information terminal 4d is a cellular phone, PHS (personal handyphone system), pager or other portable wireless terminal. The information terminal 4d is connected with the communications line 5 via a bridge (wireless base station) 6. When there is data on the network that is addressed to the portable wireless terminal, the bridge 6 forwards this data wirelessly to the portable wireless terminal. When the recipient is a portable wireless terminal, a different protocol is used, the bridge 6 has a protocol conversion function.

The communications line 5 may, for example, be a local area network (LAN) comprising a 10Base-T Ethernet line, hubs and routers. This communications line uses TCP/IP as the communication protocol.

(2-1) Constitution of a Product Processing Apparatus

Each product processing apparatus 2 includes a drive unit 20, a sensor 21, an RCU (remote control unit) 3 that processes the signals from the sensor 21 and controls the overall product processing apparatus, and an image-taking unit 22. It further includes display and input means (not shown in the figure) for inputting and displaying product processing apparatus operations.

When, for example, the product processing apparatus 2 is a combining and weighing machine, the drive unit 20 can be a scatter feeder, a radiation feeder, a pool hopper, a weight hopper and the like; and when the product processing apparatus 2 is a weight checker, it can be a conveyer belt motor or the like. The drive unit 20 drives in a manner matching the processing conducted by each product processing apparatus when a product is being processed.

When, for example, the product processing apparatus 2 is a combining and weighing machine, the drive unit 20 (an example of product processing means) can be a scatter feeder, a radiation feeder, a pool hopper, a weight hopper and the like; and when the product processing apparatus 2 is a weight checker, it can be a conveyer belt motor or the like. The drive unit 20 drives in a manner matching the processing conducted by each product processing apparatus when a product is being processed.

A camera such as a CCD camera or video camera, and an image file conversion means constitute the image-taking unit 22. The camera takes photographs of the operational conditions of the product processing apparatus. For example, it can take pictures at a set interval of the flow of products being processed or the drive conditions of each drive unit. In the event that the operations of a drive unit are not good, it will photograph that part. Image file conversion means converts the photographed image into an image file, and sends this to a processing program 39 (to be explained below) of the RCU 3.

Figure 2:
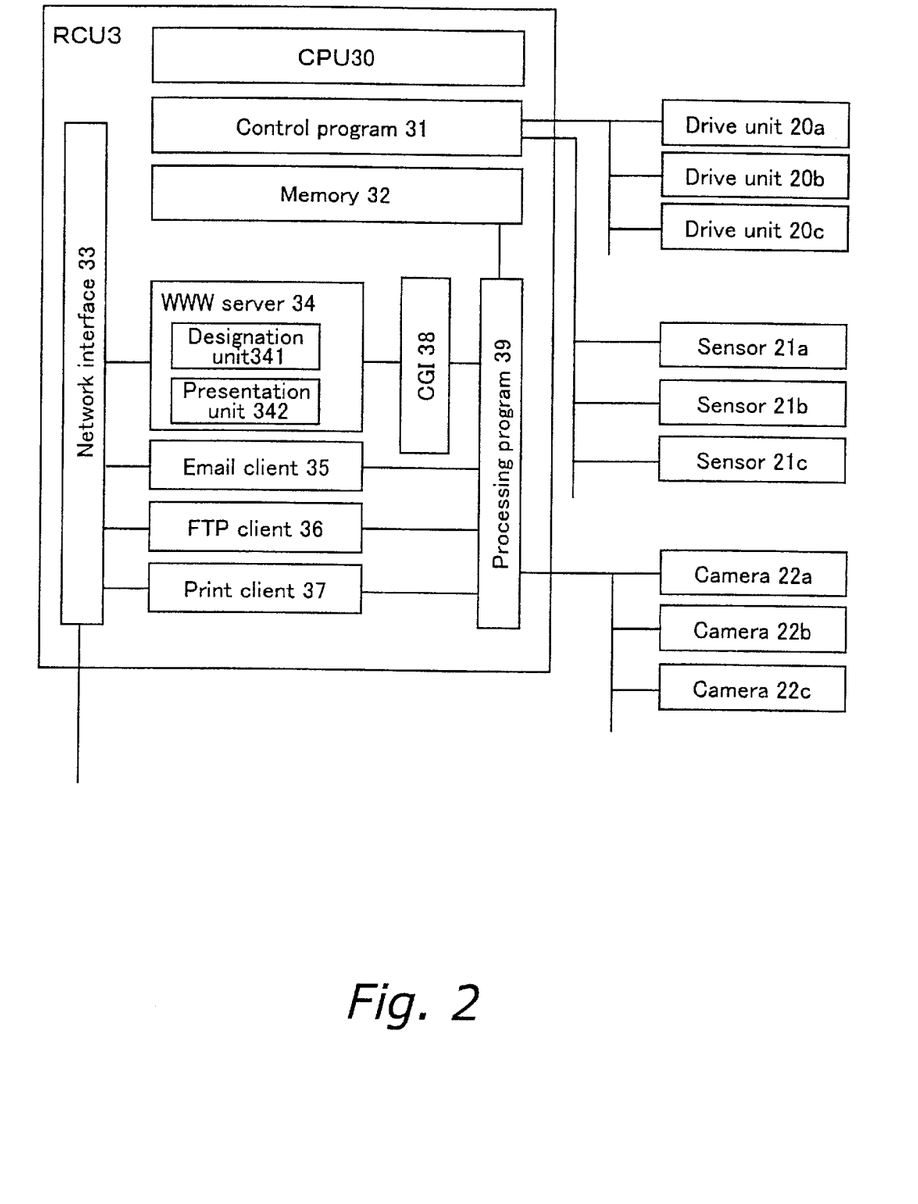
FIG. 2 is a block diagram showing the functions and constitution of a product processing apparatus and RCU.

As shown in FIG. 2, the RCU 3 includes a CPU 30, a control program 31, a memory 32, a network interface 33, a WWW server 34, an email client 35, a FTP client 36, a print client 37, a CGI (common gateway interface) 38 and a processing program 39.

The CPU 30 executes, monitors and controls the control program 31, the network interface 33, the WWW server 34, the email client 35, the FTP client 36, the print client 37, the CGI 38 and the processing program 39. The CPU 30 also reads various types of information from, and writes such information to, the memory 32.

The control program 31 is connected with the drive units 20a, 20b, 20c, etc., as well as the sensors 21a, 21b, and 21c, and conducts drive control of the drive units 20 and control of processing of signals from the sensors 21 and control of the product processing apparatus overall. For example, if the product processing apparatus is a combining/weighing machine, the control program 31 drives the scatter feeder, radiation feeder, and pool hopper, and transports the product to the weight hopper. Then, based on the weight signal from the load cell interconnected with the weighing hopper, it conducts combining/weighing. It then drives the weight hopper corresponding to the combining results and causes the products to be discharged. It also causes the error information, drive conditions, operational conditions, which are product processing apparatus operational information, to be stored in the memory 32.

Operational information that is error information refers to a product processing apparatus stopping, poor driving of a drive unit, sensor abnormalities, and the like.

Figure 4:
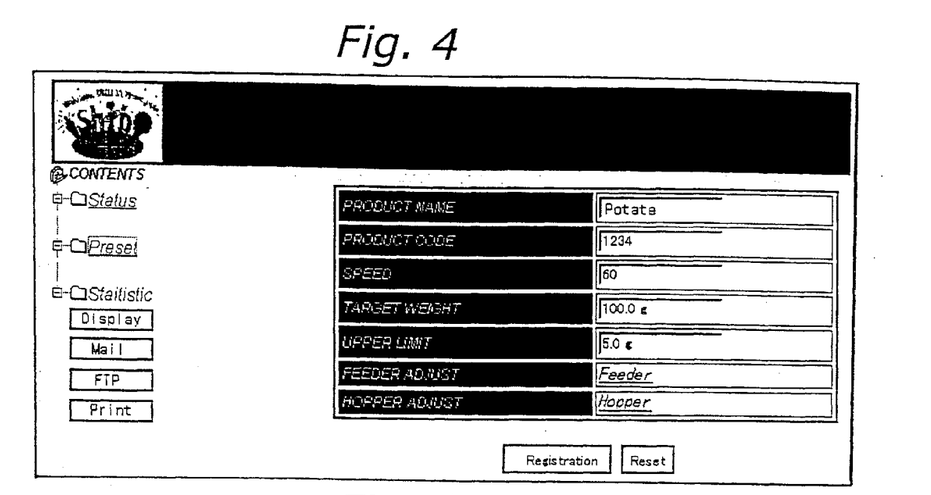
FIG. 4 is a drawing showing one example (preset information) of operational information shown on a WWW browser.

As shown in FIG. 4, which will be discussed later, drive conditions ("status") refers to product name ("product name"), product code ("product code"), weighing speed ("speed"), target weight value ("target weight"), upper limit for weight ("upper limit"), feeder drive adjustment ("feeder adjust"), hopper drive adjustment ("hopper adjust"), and the like.

Figure 5:
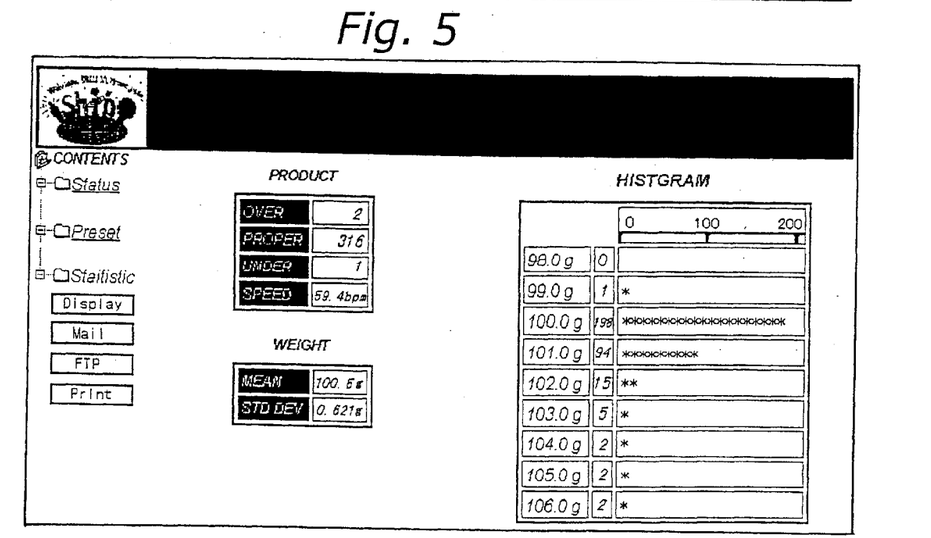
FIG. 5 is a drawing showing one example (statistical information) of operational information shown on a WWW browser.

As shown in FIG. 5, which will be discussed later, operational status refers to number over weight ("over"), number at proper weight ("proper"), number under weight ("under"), actual processing speed ("speed"), mean values of proper weight ("mean") standard deviation of proper weight ("std. dev."), frequency distribution of weight values for each weighing ("histogram") and the like.

The memory 32 stores, in addition to the error information, drive conditions, and operational status, HTML documents used by the WWW server 34 (to be described below), image files created by image file conversion means, email used by email client 35 (to be described below), files used by the FTP client 36 (to be described below), and character data to be used by the print client 37 (to be described below).

A so-called LAN adapter, for example, constitutes the network interface 33 using TCP/IP as its protocol. Unique IP addresses are set on the LAN. The network interface 33 is also connected with the communications line 5, the WWW server 34, the email client 35, the FTP client 36, and the print client 37.

The WWW server 34 includes a designation unit 341 and a presentation unit 342. The designation unit 341, based on instructions from the WWW browser (to be described below), designates execution details and execution object.

The presentation unit 342 displays the execution object on the WWW browser. Execution contents may be the displaying, for example, of an HTML document stored in the memory 32, or instructing the CGI to execute the processing program 39. The execution object may be operational information stored in the memory 32, such as error information, drive conditions, operational status, image files, as well as email data, file data and print data. The WWW browser and the WWW server communicate using HTTP (hypertext transfer protocol).

The email client 35 transmits email stored in the memory 32 to the information terminal 4c, which is an email server. For email transmission, POP (post office protocol), SMTP (simple mail transfer protocol), IMAP (Internet message access protocol) and the like may be used.

The FTP client 36 transmits files stored in the memory 32 to the FTP server of the information terminal 4a. Communication between the FTP server and FTP client is conducted using FTP (file transfer protocol).

The print client 37 transmits character data stored in the memory 32 to the information terminal 4b, which contains a print server. Communication between the print server and print client is conducted using, for example, LPS/LPD protocol. This protocol may be a print protocol using TCP/IP.

The CGI 38, based on the execution details and execution object designated by the designation unit 341, activates the processing program 39. This CGI 38 is written in Perl (practical extraction and report language). The CGI 38 delivers information between the WWW server 34 and the processing program 39, and activates the processing program of the WWW server 34. The CGI 38 includes a plurality of programs corresponding to the designation. The CGI 38, when the execution details are for display, receives the display contents from the processing program 39, and, after converting the display contents into HTML format, provides them to the WWW server 34.

The processing program 39 activates a program based on the designation provided by the CGI 38, and distributes error information email when an error has occurred and writes to the memory 32 image files converted by image file conversion means. The processing program 39 also includes a plurality of programs corresponding to execution details and execution objects.

(3) Display and Setting Examples for Operational Information

Figure 3:
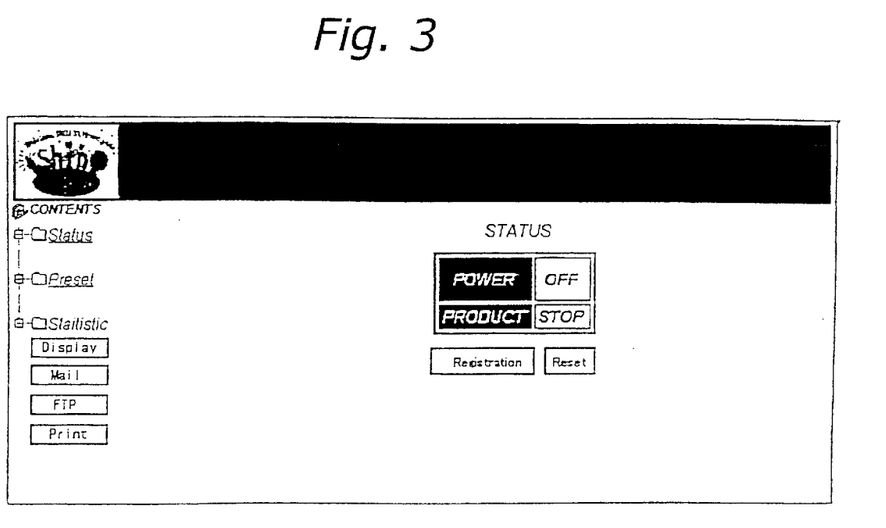
FIG. 3 is a drawing showing one example (status information) of operational information shown on a WWW browser.

FIGS. 3 to 5 show examples of screens provided by the WWW server 34 and the CGI 38 and displayed by the WWW browser of the information terminal 4a. The screen examples of FIGS. 3 to 5 are examples of a case where the product is potato chips and the apparatus is a weighing machine.

In each figure, the display portion to the left is a menu screen to be displayed when the access request from a WWW browser to the web page of the weight checker is allowed. In FIGS. 3 to 5, the three items of "Status" (settings and display for the overall operations of the apparatus), "Preset" (advance settings), and "Statistics" (display of operational status) are displayed as operational information options. Beneath "Statistics," "Display," "Mail," "FTP," and "Print" are displayed as operational status output options.

The screen example shown in FIG. 3 is an example of a screen displayed when "Status" is selected. On the "Status" screen, the overall operations of the product processing apparatus are displayed. In this example, whether the apparatus is on or off and whether the production of the product is currently stopped or is ongoing is displayed. If a user changes the apparatus on/off settings or the production start/stop settings and then clicks on the "Registration" button, operation control of this product processing apparatus 2 will be conducted based on these settings.

The screen example shown in FIG. 4 is an example of a screen displayed when "Preset" is selected from the menu. On the "Preset" screen, parameter values showing the contents of advance settings are displayed. In this example, for the product being produced, the product name, product code, weighing speed, target weight per bag, upper weight limit and the like are displayed. When "Feeder adjust" and "Hopper adjust" are selected, more detailed settings for the feeder and hopper of the weighing machine are displayed.

When a user wishes to change parameter values, the user writes the new parameter values and clicks on the "Registration" button at the bottom of the screen. This causes the new parameter values to be written to the memory 32 of the product processing apparatus 2, and based thereupon the control of the product processing apparatus 2 will be conducted.

The screen example shown in FIG. 5 is an example of a screen displayed when "Display" under "Statistics" is selected from the menu. On the "Statistics" screen, actual operational status is displayed. In this example, number over weight, number at proper weight, number under weight, actual processing speed, mean values of proper weight, standard deviation for proper weighing weight, frequency distribution of weight values for each weighing and the like are displayed. Furthermore, by using the frequency distribution of weight values for each weighing to display image information, production status can be grasped with a single look.

When a user selects any of "Mail," "FTP" or "Print" as the output for the operational status, the above-described information can be output by an email client, an FTP server or print server.

Processing Flow

Figure 6:
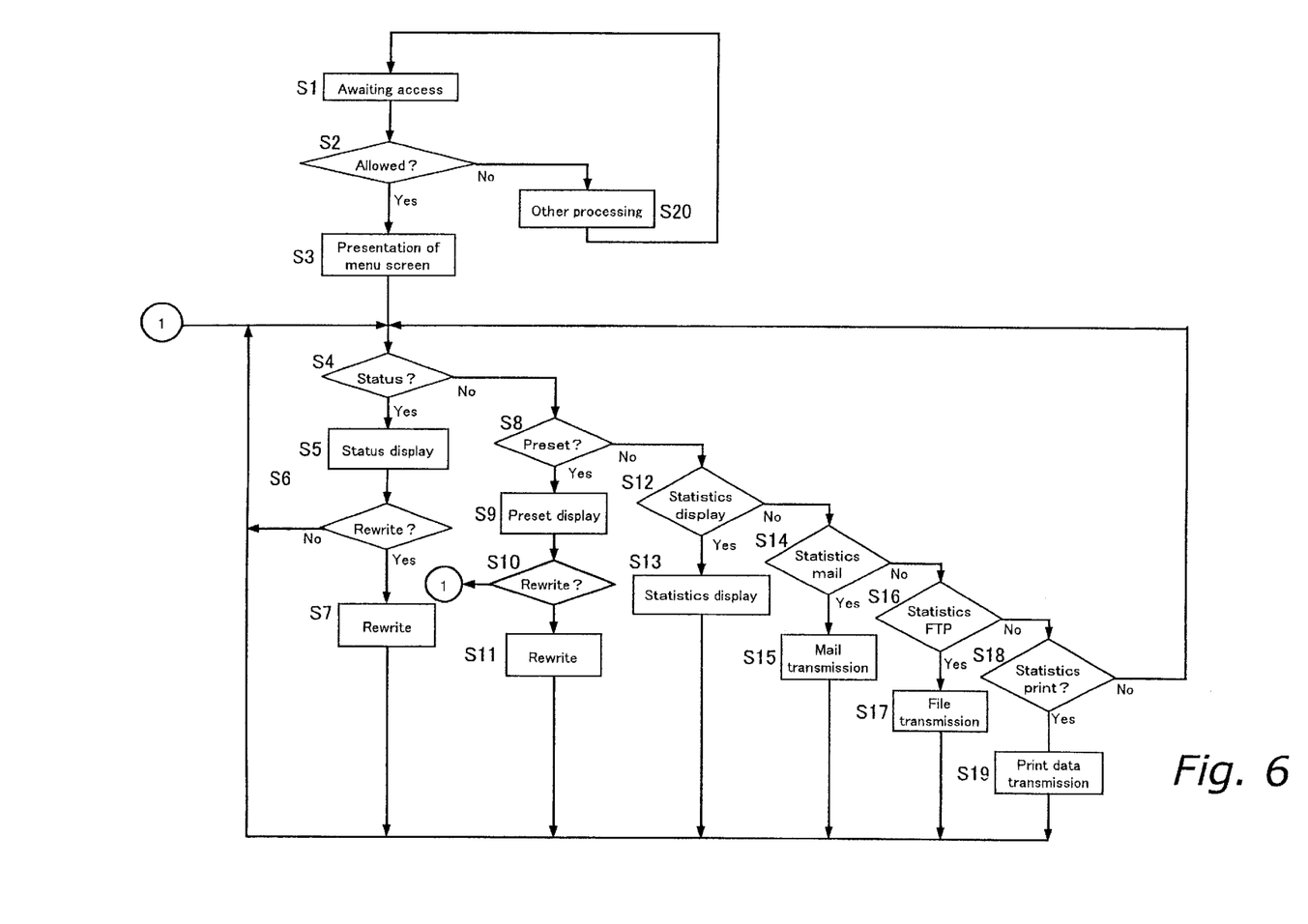
FIG. 6 is a flowchart showing one example of the processing flow conducted by the RCU.

Next, FIG. 6 will be used to explain the flow of processing in a control system according to the present invention.

FIG. 6 is a flowchart showing one example of the flow conducted by an RCU in the present embodiment. The WWW server 34 can be accessed from the WWW browser on the information terminal 4*a* by inputting as an URL (uniform resource locator) the IP address and the like assigned to each product processing apparatus.

In Step S1, the WWW server 34 waits for access from the WWW browser.

In Step S2, the WWW server 34 performs a predetermined authentication processing. For example, the WWW server 34 requests input of user ID and password, and allows access only when these match authentication information registered in advance in the memory 32. If access is allowed, control proceeds to Step S3; if access is denied, then control proceeds to Step S14, described below.

In Step S3, the WWW server 34, in order to receive selection of type of operational information, sends to the WWW browser a menu screen wherein the left-hand side portion of FIG. 3 above is displayed.

In Step S4, the WWW server 34 determines whether or not "Status" has been selected from the menu screen. If it determines "yes," then control proceeds to Step S5; if it determines "no," then control proceeds to Step S8 described below.

In Step S5, the WWW server 34 activates the CGI 38. The CGI 38 activates the processing program 39, which asks the control program 31 the status of the product processing apparatus 2. The control program 31 replies to the processing program 39 by transmitting a signal corresponding to the status of the product processing apparatus 2 at that time. Upon receiving the transmission, the processing program 39 converts the reply contents therefor into HTML format, which it transmits to the CGI 38. The CGI 38 provides the WWW server 34 with the product processing apparatus status, which has been put into HTML format. The WWW server 34 transmits the HTML-formatted status to the WWW browser. The WWW browser displays a screen showing the status of the product processing apparatus, for example, the screen in FIG. 3. Thereafter control proceeds to Step S6.

In Step S6, the WWW server 34 determines whether parameters have been rewritten. More specifically, the WWW server 34 determines whether or not the "registration" button has been clicked. If it determines that it has been clicked, control proceeds to Step S7. If the user has not clicked on the "registration" button, control returns to Step S4, and awaits the selection of a type of operational information.

In Step S7, the WWW server 34 receives from the WWW browser the parameters inputted by the user and activates the CGI 38. The CGI 38 activates the processing program 39, which changes the status of the product processing apparatus for the control program 31. Then control returns to Step S4.

In Step S8, the WWW server 34 determines whether "Preset" has been selected from the menu screen. If it determines "Yes," then control proceeds to Step S9; if it determines "No," then control proceeds to Step S12, described below.

In Step S9, the WWW server 34 activates the CGI 38. The CGI 38 activates the processing program 39, which reads the drive conditions from the memory 32. Having read the drive conditions, the processing program 39 converts the reply contents therefor into HTML format and then sends the same to the CGI 38. The CGI 38 provides the WWW server 34 with the HTML-formatted drive conditions. The WWW server 34 transmits the HTML-formatted drive conditions to the WWW browser. The WWW browser displays the drive conditions it has received in the manner, for example, as shown in FIG. 4. Thereafter control proceeds to Step S10.

In Step S10, the WWW server 34 determines whether parameters have been rewritten. More specifically, the WWW server 34 determines whether or not the "registration" button has been clicked by a user. If it determines that it has been clicked, control proceeds to Step S11. If the user has not clicked on the "registration" button, control returns to Step S4.

In Step S11, the WWW server 34 receives from the WWW browser parameters that the user has set and activates the CGI 38. The CGI 38 activates the processing program 39, which stores the rewritten drive conditions in the memory 32. Thereafter control returns to Step S4. In Step S12, the WWW server 34 determines whether or not "Display" under "Statistics" has been selected or not from the menu screen. If it determines "Yes," control proceeds to Step S13. If it determines "No," then control proceeds to Step S14, described below.

In Step S13, the WWW server 34 activates the CGI 38. The CGI 38 activates the processing program 39, which reads operational status from the memory 32. Having read operational status, the processing program 39 converts the reply contents therefor into HTML format and sends the same to the CGI 38. Upon receipt thereof, the CGI 38 provides the HTML-formatted operational status to the WWW server 34. The WWW server 34 sends the HTML-formatted operational status to the WWW browser. The WWW browser displays the operational status it has received in the manner shown, for example, in FIG. 5. Thereafter control returns to Step S4.

In Step S14, the WWW server 34 determines whether "Mail" under "Statistics" on the menu screen has been selected. If it determines "Yes," then control proceeds to Step S15. If it determines "No," then control proceeds to Step S16, described below.

In Step S15, the WWW server 34 activates the CGI 38. The CGI 38 activates the processing program 39, which reads operational status from the memory 32. The processing program 39, having read operational status, converts the set email address as well as the reply contents therefor into email format, which it writes to the memory 32. Thereafter, the processing program 39 activates the email client 35 and distributes the created email via the set email server. Thereafter control returns to Step S4.

In Step S16, the WWW server 34 determines whether "FTP" under "Statistics" has been selected from the menu screen. If it determines "Yes," then control proceeds to Step S17. If it determines "No," control proceeds to Step S18, described below.

In Step S17, the WWW server 34 activates the CGI 38. The CGI 38 activates the processing program 39, which reads operational status from the memory 32. Having read the operational status, the processing program 39 converts the reply contents therefor into a file format, which it writes to the memory 32. Thereafter, it activates the FTP client 36, and causes it to distribute the file to the set FTP server. Thereafter, control returns to Step S4.

In Step S18, the WWW server 34 determines whether or not "Print" under "Statistics" on the menu screen has been selected. If it determines "Yes," then control proceeds to Step S19. If it determines "No," then control returns to Step S4.

In Step S19, the WWW server 34 activates the CGI 38. The CGI 38 activates the processing program 39, which reads operational status from the memory 32. Having read operational status, the processing program 39 converts the contents of what it has read into print data, which it writes to the memory 32. Thereafter, it activates the print client 37, and causes it to distribute the created print data to the set print server. Thereafter control returns to Step S4.

In Step S2 above, if access from the WWW browser is denied, control proceeds to Step S20. In Step S20, predetermined other processing is conducted. For example, the WWW server transmits to the WWW browser message display screens such as "Access Denied."

An explanation will now be given of error occurrences. When an error occurs, error information is distributed by email. When an error occurs, the error information is stored in the memory 32 by the control program 31. Simultaneously thereto, the processing program 39 for error processing is activated by the control program 31. The processing program 39 for error processing calls the error information from the memory 32, converts the set email address and the image file of the operational problem recorded at that time into email format, and writes these to the memory 32. Thereafter, the email client 35 is activated, and is caused to distribute the created email. The error information may also be converted to file and print data format and then sent to the set FTP server or print server.

In this embodiment, because the product processing apparatus comprises a WWW server, the display of operational information and the setting thereof can be conducted by a WWW browser on an information terminal. There is no need to connect the information terminals and the product processing apparatuses with a dedicated line, making construction of the control system easy. Furthermore, because ordinary applications can be used as the applications for controlling the operational information, operation becomes easy. Furthermore, because by using ordinary applications, the operational information can be output and set in a variety of forms, locational and temporal restrictions in the control of the product processing apparatuses can be greatly relaxed. In addition, in this embodiment, the operational information can be printed on a printer on the network. Thus there is no need to connect the product processing apparatuses to a print device.

Other Embodiments (a) In the above first embodiment, a 10Base-T Ethernet served as the communication line 5; 10 Base-2, 10 Base-5, 100Base-T, etc., may also be used. The communication line 5 may also be changed to a wireless network. In such a case, the network interface 33 of the product processing apparatuses and the communication interface of the information terminals 4a through 4c may be adapted to work with a wireless network. In other words, any wireless network may be used so long as the product processing apparatuses and the information terminals 4a through 4c can use TCP/IP.

Furthermore, if at one end of the communication line 5, modems, terminal adapters, routers and the like are used, and public lines such as telephone lines are used, interconnection with external networks, such as the Internet, becomes possible. Doing this even further relaxes restrictions on where the system can be used.

(b) In the first embodiment, the RCU 3 was provided with a network interface 33; it may be further provided with an interface for portable wireless terminals. The mail server on the information terminal 4c may also be provided with an interface for portable wireless terminals. Doing this allows such interfaces to connect with portable wireless terminals, and allows error information to be sent from a product processing apparatus to a portable wireless terminal of a system manager.

(c) In the first embodiment, HTML documents were used as the form in which the operational information was presented, but the operational information may be presented in structured documents written in such markup languages as SGML (Standard Generalized Markup Language) and XML (eXtensible Markup Language).

(d) In the first embodiment, a CGI was used to activate the processing programs 39, but the various processing programs may be executed using SSI (Server Side Includes) and Asp (Active Server Page).

(e) In the first embodiment, the product processing apparatuses automatically sends error information in such formats as email, files, and print data, but error information may be added to the display menu, so that it can be displayed on a WWW browser.

(g) In the first embodiment, IP addresses were uniquely set on the LAN, but DHCP (Dynamic Host Configuration Protocol) may be used to allocate IP addresses dynamically.

(h) In the first embodiment, operational status was converted to print data when printing, but in a case where a printer capable of using FTP protocol is used, FTP may be used for output to a printer.

Industrial Applicability

By using the present invention, a production line control system using existing applications and network resources can be built, and adapting the system to changes in the production line becomes easy. If a network using TCP/IP is used, restrictions on the places from which a production line can be controlled are reduced. Since control is possible using existing applications, not only is operation easy, but the time needed for learning operation is reduced.

What is claimed is:

1. A product processing apparatus adapted to be used in a product production line that includes a network and an information terminal, said product processing apparatus being for processing a product and presenting operational information over the network to the information terminal, comprising:

product processing means for processing the product;

a network interface using TCP/IP to communicate with the information terminal;

storage means storing the operational information, the operational information being issued based at least on said product processing means;

a WWW server receiving from a WWW browser of the information terminal instructions regarding the operational information to be presented to the information terminal, and designating operational information pursuant to the instructions received from said WWW browser;

presentation means for presenting the designated operational information to the information terminal;

delivery means for delivering operational information between said storage means and said presentation means; and conversion means for converting the stored operational information in said storage means into a format appropriate to the information terminal.

2. A product processing apparatus according to claim 1, wherein said conversion means converts operational information into data to be displayed on a WWW browser, and said presentation means is a WWW server sending said converted operational information to a WWW browser on the information terminal.

3. A product processing apparatus according to claim 1, wherein said conversion means converts operational information into print data, and said presentation means is a print client sending said converted operational information to the information terminal having a print server function.

4. A product processing apparatus according to claim 1, wherein said conversion means converts operational information into email, and said presentation means is an email client sending said converted operational information to the information terminal having email server function.

5. A product processing apparatus according to claim 1, wherein said conversion means converts operational information into a file, and said presentation means is an FTP client sending said converted operational information to the information terminal, the information terminal having a FTP server function.

6. A product processing apparatus according to claim 1, wherein image information is included in operational information, and said product processing apparatus further comprises image-taking means for taking images of said product processing apparatus.

7. A product processing apparatus adapted to be used in a product production line that includes an information terminal and a network, said product processing apparatus being capable of setting drive conditions from the information terminal over the network, comprising:

product processing means for processing the product;

a network interface using TCP/IP to communicate with the information terminal;

storage means for storing the drive conditions, the drive conditions being based at least on said product processing means;

a WWW server receiving from a WWW browser of the information terminal drive conditions set at the information terminal; and update means for updating, pursuant to the received drive conditions, the drive conditions stored in said storage means.

8. A product processing apparatus adapted to be used in a product production line that includes an information terminal and a network, said product processing apparatus being capable of setting drive conditions from the information terminal over the network, comprising:

product processing means for processing the product;

a network interface using TCP/IP to communicate with the information terminal;

storage means for storing the drive conditions, the drive conditions being based at least on said product processing means;

reception means for receiving a file from the information terminal, such that the information terminal can set the drive conditions of said product processing means;

update means for updating, pursuant to the received file, the drive conditions stored in said storage means.

9. A production line comprising:

a plurality of product processing apparatuses;

an information terminal; and a network operatively connecting said plurality of product processing apparatuses and said information terminal, each of said product processing apparatuses having:

product processing means for processing the product;

a network interface using TCP/IP to communicate with said information terminal;

storage means for storing the operational information, the operational information being based at least on said product processing apparatus;

a WWW server receiving from a WWW browser of said information terminal designation of operational information to be presented to said information terminal, and being capable of designating operational information pursuant to the instructions received from said WWW browser, and being capable of receiving from said WWW browser of said information terminal drive conditions set at said information terminal;

presentation means for presenting the designated operational information to said information terminal;

delivery means for delivering operational information between said storage means and said presentation means pursuant to said designation;

conversion means for converting the stored operational information into a format appropriate to said information terminal; and update means for updating drive conditions stored in said storage means, pursuant to drive conditions received from said WWW browser; and said information terminal having:

output means for outputting the operational information presented by said presentation means; and a WWW browser capable of setting the drive conditions and designating the operational information to said WWW browser of said product processing apparatus.

10. A product processing apparatus adapted to be used in a product production line that has an information terminal and a network, said product processing apparatus sending operational warning information over the network to the information terminal, comprising;

product processing means for processing the product;

specification means for determining whether said information terminal is a portable wireless terminal;

communication means for communicating with the portable wireless terminal; and conversion means for converting the operational warning information into voice data or email data, the operational warning information being issued based at least on said product process means;

said product processing apparatus sending said converted operational warning information via said communications means.

11. A product processing apparatus according to claim 2, wherein image information is included in operational information, and said product processing apparatus further comprises image-taking means for taking images of said product processing apparatus.

12. A product processing apparatus according to claim 3, wherein image information is included in operational information, and said product processing apparatus further comprises image-taking means for taking images of said product processing apparatus.

13. A product processing apparatus according to claim 4, wherein image information is included in operational information, and said product processing apparatus further comprises image-taking means for taking images of said product processing apparatus.

14. A product processing apparatus according to claim 5, wherein image information is included in operational information, and said product processing apparatus further comprises image-taking means for taking images of said product processing apparatus.

* * * * *